US005217773A

United States Patent [19]

Yoshida

[11] Patent Number: 5,217,773

[45] Date of Patent: Jun. 8, 1993

[54] IMAGE PROTECTIVE FILM

[75] Inventor: Masato Yoshida, Saitama, Japan

[73] Assignee: Toppan Printing Co., Ltd., Tokyo, Japan

[21] Appl. No.: 820,769

[22] Filed: Jan. 15, 1992

[30] Foreign Application Priority Data

Jan. 16, 1991 [JP] Japan ................................ 3-015770

[51] Int. Cl.[5] ............................................ C09J 7/02

[52] U.S. Cl. ..................................... 428/40; 428/349; 428/354; 428/355

[58] Field of Search ................. 428/40, 349, 343, 354, 428/355

[56] References Cited

U.S. PATENT DOCUMENTS

| | | | |
|---|---|---|---|
| 4,378,392 | 3/1983 | Segel | 428/40 |
| 4,522,881 | 6/1985 | Kobayashi | 428/336 |
| 4,581,267 | 4/1986 | Miller | 428/40 |
| 4,756,963 | 7/1988 | Yamamoto | 428/354 |
| 4,780,348 | 10/1988 | Yamamato | 428/43 |
| 4,977,136 | 12/1990 | Fujiwara | 503/227 |
| 5,085,907 | 2/1992 | Smith | 428/40 |

FOREIGN PATENT DOCUMENTS

| | | |
|---|---|---|
| 0103024 | 3/1984 | European Pat. Off. . |
| 0178332 | 4/1986 | European Pat. Off. . |
| 9101223 | 2/1991 | PCT Int'l Appl. . |

*Primary Examiner*—Jenna L. Davis
*Attorney, Agent, or Firm*—Armstrong, Westerman, Hattori, McLeland & Naughton

[57] ABSTRACT

An image protective film comprising a laminated film comprising a base layer, a release layer formed of a resin having no compatibility with the base layer and an adhesive layer formed of a thermoadhesive resin; said laminated film. The film is superposed on an image surface of an object article so as for the adhesive layer to come into contact with the image surface. Upon heating, it becomes separable from the object article in such a way that the base layer and the release layer remain on the object article to form a protective layer only on the heated area thereof.

2 Claims, 1 Drawing Sheet

IMAGE PROTECTIVE FILM

BACKGROUND OF THE INVENTION

1. Field of the Invention

This invention relates to an image protective film. More particularly, the present invention relates to an image protective film that can in a simple way adequately protect the surfaces of images formed by various image recording processes, in particular, can also adequately protect the surface of an image formed by a sublimiation transfer system.

2. Description of the Related Art

Various methods for protecting image surfaces have been hitherto proposed in order to improve light resistance, moisture resistance, scratch resistance, etc. of images formed on paper, plastic film or the like. As a simple method that can be of everyday use a method is known in which a plastic film is merely adhered on an image surface by the use of an adhesive, or a material coated with a hot-melt adhesive is contact-bonded to a base film under application of heat.

With the recent widespread use of prepaid cards, ID cards, membership cards, etc., such protection of image surfaces has become popular also when such cards are prepared. Then, there is an increasing demand for making it feasible not only for those who are engaged in image formation or card preparation but also those who distribute cards or use cards to easily apply a means for the protection of the cards.

Such conventional methods for the protection of image surfaces, however, have been unable to adequately protect images formed by any image recording processes. That is to say, according to conventional methods commonly used, a frame is formed around an object article (an article to be protected) such as a card on which an image has been formed, so that the article to which the protection has been applied has a larger size than the original one. Hence, the cards often become inconvenient to carry, and also, in the case of those which are strictly regulated on their shapes in use as exemplified by prepaid cards, there have been problems such that a card can not be inserted to a fixed card inlet or the card can not function as a card.

Some of conventional methods include a method in which no frame is formed around the object article. Such a method, however, has required a troublesome operation because, after a protective film has been pasted to the image surface of the object article, the film protruding from the article must be cut off in a separate step.

In addition, in conventional methods, plasticizers are used in the protective films and adhesives that come into contact with the image surfaces, the plasticizers for the purpose of imparting flexibility to the films. Hence if, for example, any conventional method is applied for the surface protection of an image formed by thermal recording of a sublimation transfer system as in thermal transfer, an extreme migration of dyes may occur on the image surface to rough the surface and also cause bleeding of image or fading at an early stage. Also when the method is applied to an image surface formed by a melt transfer system, the migration of dyes as in the case of the protection of the image surface formed by the sublimation transfer system does not occur, but blocking may occur. Thus, any of the conventional methods can not also be a method that enables satisfactory protection of image surfaces in that case.

Meanwhile, the image recording method according to the thermal transfer system allow use of a compact apparatus which requires only simple maintenance. Hence, this system is widely used. In particular, the sublimation transfer system can provide an image with excellent gradation, and in recent years has become prevalent as an image forming method when images are recorded in full colors. Hence, the conventional methods that can not well protect the image formed by the sublimation transfer system have been considered very unsatisfactory as a method for the protection of such image surfaces.

SUMMARY OF THE INVENTION

The present invention was made in order to solve the above problems involved in the conventional methods for the protection of image surfaces. Thus an object of the present invention is to make it possible to adequately protect in a simple way the surfaces of images formed by various image formed methods including the sublimation transfer system.

To achieve the above object, the present invention provides an image protective film comprising a laminated film comprising a base layer, a release layer formed of a resin having no compatibility with the base layer and an adhesive layer formed of a thermoadhesive resin; wherein said laminated film, when superposed on an image surface of an object article such that said adhesive layer comes into contact with said image surface, and is thereafter separated from said object article upon heating, said adhesive layer and said release layer remain on said object article to form a protective layer.

DETAILED DESCRIPTION OF THE INVENTION

The image protective film of the present invention will be described below in detail with reference to the accompanying drawings.

Figure 1A:
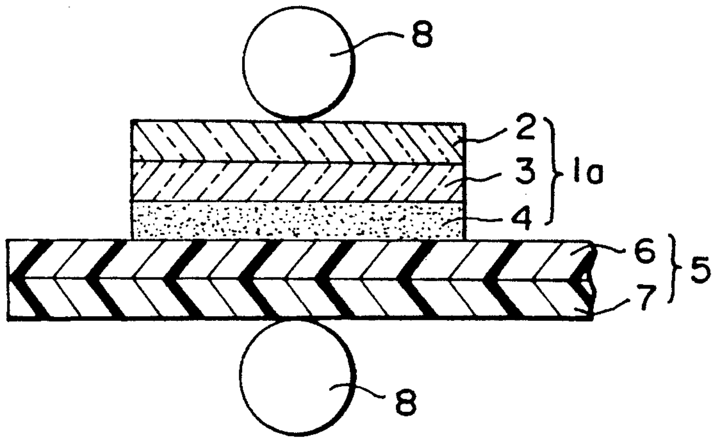
FIGS. 1A and 1B illustrate how to use the image protective film of the present invention.
Figure 1B:
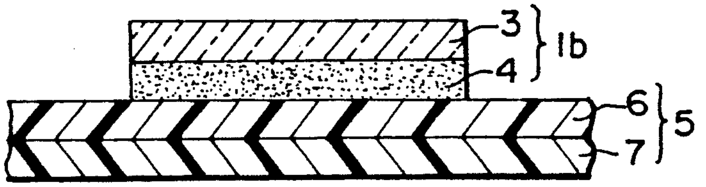

FIGS. 1A and 1B illustrates how to use the image protective film of the present invention. As shown in the drawings, an image protective film 1*a* according to the present invention comprises a laminated film comprised of a base layer 2, a release layer 3 and an adhesive layer 4. FIG. 1A illustrates the state wherein the image protective film 1*a* is superposed on an object article 5 comprised of an image-receiving layer 6 and a substrate 7, and both are heated with a pair of heat rolls 8 over an image-formed area of the image-receiving layer 6. FIG. 1B illustrates a state wherein, after the image protective film 1*a* and the object article 5 have been heated as shown in FIG. 1A, the image protective film 1*a* is peeled and removed from the object article 5 in such a way that the release layer 3 and the adhesive layer 4 of the image protective film 1*a* only remain on the heated area of the object article 5 so as to form a protective layer 1*b*.

In such an image protective film 1a, the base layer 2 that can be used may include various plastic films as exemplified by polyester films, polystyrene films, polysulfone films, polyimide films, polyvinyl alcohol films, aromatic polyamide films and aramid films, or thin paper sheets such as cellophane and condensor paper.

In particular, a PET (polyethylene terephthalate) film may preferably be used in view of its heat resistance and stretching properties.

The base layer 2 may preferably have a thickness of from 9 to 50 μm, taking account of heat sensitivity.

The release layer 3 is formed of a resin having no compatibility with the base layer 2. Hence, upon heating of the image protective film 1*a* superposed on the image-receiving layer 6 of the object article 5, the base layer 2 becomes separable from the release layer 3 at the part thus heated. In other words, the release layer 3 together with the adhesive layer 4 become separable from the original image protective film 1*a*, so that the protective layer 1*b* can be formed. In the case when, for example, the base layer 2 is formed of a PET film, such a release layer 3 may preferably be formed of an acrylic resin film having no compatibility with the PET film.

With regard to the part heated, clear separation of the resin of the release layer 3 should preferably be improved so that the base layer 2 can be readily separated from the release layer 3 to form the protective layer 1*b*. For this purpose, the release layer 3 may preferably incorporate a release agent such as polyethylene filler or silica filler.

The release layer 3 may preferably have a thickness of 3.0 μm or less, and more preferably 2.5 μm or less. This thickness control can prevent burrs from being formed around the protective layer 1*b*.

The adhesive layer 4 is formed of a resin capable of adhering the release layer 3 of the image protective film 1*a* to the image-receiving layer 6 of the object article 5 upon heating. For example, in the case when the base layer 2 is formed of the PET film and the release layer 3 is formed of the acrylic resin film, the adhesive layer 4 can be formed of polyester resin and epoxy resin. In this instance, if an image formed by the sublimation transfer system has been formed in the image-receiving layer 6, no plasticizer should be used so as to prevent its image quality from being lowered.

To the adhesive layer 4, an ultraviolet absorbent may preferably be added beforehand for the purpose of improving the light resistance of the image. This means that the ultraviolet absorbent is mixed in a layer closest to the image-receiving layer 6, and hence the light resistance can be efficiently improved and also it becomes possible to prevent the object article 5 from being deteriorated with time and brought into the state that its surface becomes powdery.

The adhesive layer 4 may preferably have a thickness of 3.0 μm or less, and more preferably 2.5 μm or less, in order to prevent burrs from being formed as in the release layer 3.

In addition to the foregoing, in the image protective film 1*a* of the present invention, various additives may be optionally mixed in the respective base layer 2, release layer 3 and adhesive layer 4. For example, a dye, a pigment or a filler may be mixed in the release layer 3 or adhesive layer 4.

In addition when such additives are used, the protective film of the present invention may preferably be made so as to have a light transmission of 60% or more in the visible light region.

The base layer 2, release layer 3 and adhesive layer 4 can be laminated into a film by coating them using a reverse coater, an air-knife coater, a die coater or the like followed by drying, according to a conventional method.

In use of the image protective film 1*a* of the present invention, first, as shown in FIG. 1A, the image protective film 1*a* is superposed to the object article 5 in such a way that the adhesive layer 4 of the former comes into contact with the image-receiving layer 6 of the latter on which any desired image has been formed. The superposed protective film 1*a* and object article 5 are then heated by any heating means such as the heat rolls 8.

The heating conditions in this stage depend on the type or the like of the resin that forms the release layer 3 or adhesive layer 4. For example, when the base layer 2 is formed of PET film, the release layer 3 is of acrylic resin, and the adhesive layer 4 is of polyester resin and epoxy resin, the heating may usually be carried out at a temperature of from 150° to 200° C. at a pressure of from 1 to 3 kg (linear pressure) for a time of from 1 to 5 seconds. The portion to which the heating is applied can be appropriately decided as desired. For example, when an image formed over the whole surface on the object article 5 should be protected, the whole area on the object article 5 may be heated. When an image is formed partly on the object article 5, only the part on which the image is formed may be heated. There is a possibility that the object article 5 curls when an image is formed thereon. To correct the curling thus occurred, the protective layer 1*b* may be formed by heating the whole surface on the object article 5.

After the heating, the image protective film 1*a* may be merely peeled and removed from the object article 5. Thus, it becomes possible to form the protective layer 1*b* with ease, having excellent light resistance which has, moisture resistance, plasticizer resistance, chemical resistance, scratch resistance, gate resistance, etc. It also becomes possible for the protective layer 1*b* to correct the curl of the object article 5.

There are no particular limitations on the image that can be protected by the image protective film 1*a* of the present invention. For example, it is possible to protect images formed by thermal transfer systems such as sublimation transfer and melt transfer, printing systems such as offset printing, ink-jet recording systems, static toner recording systems, etc.

The object article 5 can be of various forms. For example, it may include articles comprised of a substrate such as paper or plastic and provided thereon a dyeable layer formed of polyester resin or the like, those in which a dyeable resin such as vinyl chloride resin itself is formed into films, those in which a dyeable resin serves as a substrate as in OHP transparent films, and those in which the material itself is a molded product of a dyeable resin such as in ID cards or prepaid cards.

According to the image protective film of the present invention, the release layer having no compatibility with the base layer becomes separable from the base layer upon heating, and can form the protective layer in the state that it is adhered to the object article through the adhesive layer. Thus, the desired part may be heated, so that the protective layer can be simply formed only at the heated part. When it is formed, no unwanted frame is formed around the protective layer. The formation of the protective layer over the whole surface of the object article makes it possible to correct any curl of the object article.

The protective layer formed from the image protective film of the present invention can improve the light resistance, moisture resistance, chemical resistance, scratch resistance, etc. of the images formed by various image recording processes and can adequately protect the object article. In particular, in the embodiment in which no plasticizer is contained in the adhesive layer, no plasticizer is present at the portion coming into contact with the object article. Hence, the image formed by the sublimation transfer system can also be very well protected without causing any migration of dyes.

EXAMPLES

The present invention will be more specifically described by giving Examples. In the following, "part(s)" refers to "part(s) by weight".

To a PET film (thickness: 16 μm) serving as a base layer, a release layer (thickness: 2.5 μm) and an adhesive layer (thickness: 2.5 μm) each having the following composition were successively laminated using a roll coater. Thus an image protective film of the present invention was prepared.

Release layer

| | |
|---|---|
| Acrylic acid (PARALOID, trade name; available from Rhom Hass Co.) | 10 parts |
| Polyethylene filler (180; available from Toyo Ink Mfg. Co., Ltd.) | 1 part |
| Merthyl ethyl ketone | 45 parts |
| Toluene | 45 parts |
| (Adhesive layer) | |
| Polyester resin (BYLON 200, trade name; available from Toyobo Co., Ltd.) | 3 parts |
| Epoxy resin | 3 parts |
| Ulraviolet absorbent (TINUVIN, trade name; available from Ciba Geigy Ag) | 2 parts |
| Methyl ethyl ketone | 25 parts |
| Toluehe | 25 parts |

Evaluation

Using a sublimiation transfer printer GZ-P21, manufactured by Sharp Corp., a full-color image was transferred to a PET substrate to form an image of a sublimation transfer system, thus giving an object article. On the image surface thereof, the image protective film obtained in the above example was superposed in such a way that its adhesive layer came into contact with the image surface, which were then heated at a temperature of 160° C. at a pressure of 1.5 kg (linear pressure) for a time of 2 seconds. Thereafter, the image protective film was peeled to form a protective layer on the image surface.

Then, evaluation was made in the following way of its light resistance, chemical resistance, plasticizer resistance, scratch resistance and curl. For comparison, the same evaluation was also made of those properties of an article on which no protective layer was formed.

Light Resistance

Degree of fading when irradiated with a mercury lamp for 140 hours.

A: Density loss of less than 10% with respect to the initial density.
B: Density loss of not less than 10% and less than 20% with respect to the initial density.
C: Density loss of not less than 20% and less than 40% with respect to the initial density.
D: Density loss of not less than 40% with respect to the initial density.

Chemical resistance

The state of surface observed when immersed in each of alcohol, acid (pH 3) and alkali (pH 11) for 2 minutes and thereafter naturally dried.

A: No change.
B: No change (but the surface becomes swelled).
C: Layer peels.
D: Layer peels to affect print surfaces.

Plasticizer resistance

Degree of migration occurring when an eraser containing a plasticizer in a large quantity (MONO, trade name; available from Tombo) has been pressed against the protective layer for 24 hours.

A: No dye transfers to the eraser side.
B: The protective layer is plasticized.
C: The protective layer peels.
D: Dyes transfer to the eraser side.

Scratch resistance

Hardness test carried out using a pencil with a hardness H or B.

A: H or higher
B: H
C: H to B
D: B

Curl

Measured on a scale plate.

TABLE 1

| | Present Invention | Comparative Example |
|---|---|---|
| Light Resistance: | A | C |
| Chemioal resistance (alcohol): | A | C |
| Chemical resistance (pH 3): | A | B |
| Chemical resistance (pH 11): | A | B |
| Plasticizer resistance: | A | D |
| Scratch resistance: | B (H) | D (B) |
| Curl: | 2 to 3 mm | 1.5 mm |

As having been described above, the image protective film of the present invention makes it possible to form a protective layer on the image surface by a simple method, and to protect the image with ease. When the protective layer is formed, no unwanted frame is formed around it.

In addition, the protective layer can be formed at any desired part of the object article. Formation of the protective layer over the whole surface of the object article makes it also possible to correct the curl of the object article.

Moreover, the protective layer formed using the present invention can improve the light resistance, moisture resistance, plasticizer resistance, chemical resistance, scratch-resistance; gate resistance, etc. of the surfaces of images formed by various recording processes. In particular, in the embodiment in which no plasticizer is contained in the adhesive layer, it becomes possible to also adequately protect the image formed by a sublimation transfer system.

What is claimed is:

1. An image protective film comprising a laminated film comprising a base layer comprising a PET film, a release layer formed of a resin having no compatibility with the base layer and comprising an acrylic resin film containing a polyethylene filler, and an adhesive layer formed of a thermoadhesive resin comprising a polyester resin, an epoxy resin and an ultraviolet absorbent; wherein when said laminated film is superposed on an image surface of an object article such that said adhesive layer comes into contact with said image surface and is thereafter heated, the base layer is separated from said object article, and said adhesive layer and said release layer remain on said object article to form a protective layer.

2. The image protective film according to claim 1, wherein said adhesive layer contains no plasticizer.

* * * * *